No. 845,082. PATENTED FEB. 26, 1907.
W. P. HENDON.
WHEELED PLOW.
APPLICATION FILED JUNE 26, 1906.
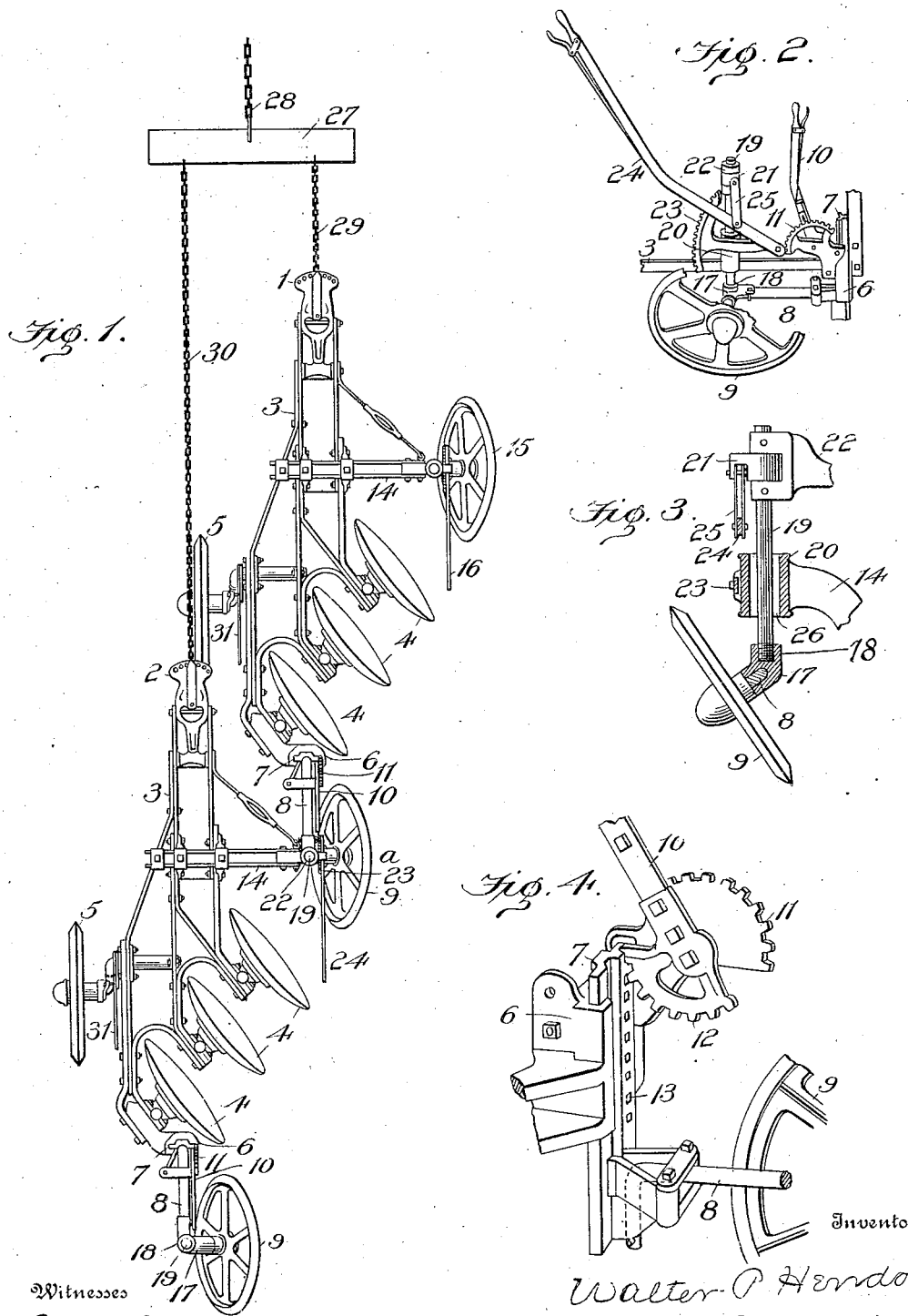

UNITED STATES PATENT OFFICE.

WALTER P. HENDON, OF DALLAS, TEXAS, ASSIGNOR TO EMERSON MANUFACTURING COMPANY, OF ROCKFORD, ILLINOIS, A CORPORATION OF ILLINOIS.

WHEELED PLOW.

No. 845,082.     Specification of Letters Patent.     Patented Feb. 26, 1907.

Application filed June 26, 1906. Serial No. 323,466.

*To all whom it may concern:*

Be it known that I, WALTER P. HENDON, a citizen of the United States, residing at Dallas, in the county of Dallas and State of Texas, have invented certain new and useful Improvements in Wheeled Plows, of which the following is a specification.

The object of this invention is to construct a wheeled plow comprising a plurality of sections, each section supporting a plowing attachment or a plurality of plowing attachments, and the utilization of a single furrow-wheel located adjacent to the rear end of one section and to the forward portion of the next rear section, assisting to support a part of the weight of both sections.

The further object of this invention is to directly connect a plurality of sections, each section supporting a plowing attachment or a plurality of plowing attachments in order that the sections will exert a force one against the other to prevent their separation.

The further object of this invention is, in connection with the single furrow-wheel, to provide means for adjusting the sections in their connection with each other in a vertical manner and to adjust the rear portion of one section and the forward portion of the next rear section vertically independent of each other.

In the accompanying drawings, Figure 1 is a plan view of a plurality of plow-supporting-sections connected together. Fig. 2 is a perspective view of the connection between the sections, showing the lifting-levers. Fig. 3 is a vertical section on dotted line *a*, Fig. 1. Fig. 4 is a perspective view of the lever for adjusting the rear end of the sections.

In the drawings I have shown my improvements in connection with a construction of plow patented to me and to such general construction I lay no claim in this application.

The sections 1 and 2 each comprise a main frame 3, each frame supporting the plowing attachments 4. A land-wheel 5 is supported by the main frame and is provided with the usual adjusting-lever 31. The rear end of the main frame has a vertical guideway 6, which guides a support 7, to which is connected an arm 8, serving to connect the furrow-wheel 9 with the main frame. A hand-lever 10 is pivotally supported by the rear end of the main frame and has an engagement with the toothed segment 11, connected to the main frame. This hand-lever has a toothed quadrant 12 connected to it, which engages teeth 13 in the support 7. By means of this hand-lever the rear end of the main frame can be raised and lowered, the furrow-wheel acting as a support.

The sections have a cross-bar 14, located in front of the plowing attachments. This cross-bar for the front section has a furrow-wheel 15, connected to it by the usual hand-lever arrangement 16, by means of which the forward portion and furrow side of the main frame can be vertically adjusted. Each arm 8 of the sections has a bracket 17 surrounding it, and each has a socket 18 extending from its upper face. Within the socket 18 of the arm 8 of the forward section is located a cylindrical shaft 19 and in this instance is screw-threaded therein. The cross-arm 14 of the rear section supports a tubular sleeve 20, which receives the cylindrical shaft 19 in a manner to slide vertically in connection therewith. The upper end of the cylindrical shaft 19 supports a collar 21, and which is held from movement lengthwise of the shaft by the clamp 22. From the clamp 22 extends an arm which has the usual steering means connected to it. A toothed segment 23 has a fixed connection with the sleeve 20, and to the toothed segment is pivoted a hand-lever 24, which has a dog engagement with the toothed segment.

Links 25 form a connection between the collar 21 and the hand-lever 24. By means of the hand-lever 24 the forward furrow side of the rear section can be raised and lowered independent of the rear portion of the front section and held at any point of adjustment, and by the hand-lever 10 the rear end of the front section can be raised and lowered. By these adjustments the plowing attachment or attachments of both sections can be vertically adjusted so that both sets of plowing attachments will cut the same depth. The rear furrow-wheel will run in the furrow made by the plowing attachment just ahead of it, and the single furrow-wheel located adjacent to the rear end of one section and the forward end of the next rear section will assist in supporting both sections.

The central opening 26 of the sleeve 20, supported by the cross-bar 14 of the rear section is somewhat larger than the cylindrical shaft 19 in order that the forward end of the rear section in its connection with the shaft may have a rocking or oscillating movement to accommodate it to the unevenness of the ground.

The engine is intended to connect with the draft-bar 27 by the chain 28. A chain 29 connects the draft-bar and the forward end of the front section, and a chain 30 connects the draft-bar and the forward end of the rear section.

The means for holding the furrow-wheel 15 in proper working position are not shown, as they form no part of this invention.

By the employment of the single furrow-wheel between the sections a much shorter plow can be produced. In the drawings I have only shown two sections; but more sections can be connected in the same manner. It will be noticed that the draft connection is independent of the connection between the sections.

I claim as my invention—

1. In a wheeled plow, the combination of a plurality of connected sections, wheels connected to each section, and a plurality of plowing attachments supported by each section, the plowing attachments of all the sections located in the same general lengthwise direction, the plowing attachments of a section located laterally with relation to the plowing attachments of the other sections, one of the wheels being a furrow-wheel and located between the last plowing attachment of one section and the first plowing attachment of another section.

2. In a wheeled plow, the combination of a plurality of connected sections, wheels supporting the sections and a plurality of plowing attachments supported by each section, the plowing attachments of all the sections located in the same general lengthwise direction, the plowing attachments of a section located laterally with relation to the plowing attachments of the other sections, one of the wheels being a furrow-wheel and located between the last plowing attachment of one section and the first plowing attachment of another section.

3. In a wheeled plow, the combination of a plurality of connected sections, a plowing attachment supported by each section, and wheels supporting the sections, there being one more furrow-wheel than the number of sections.

4. In a wheeled plow, the combination of a plurality of connected sections, a plurality of plowing attachments supported by each section, and a number of land and furrow wheels supporting the sections, there being one more furrow-wheel than the number of sections.

5. In a wheeled plow, the combination of a plurality of connected sections, a plurality of plowing attachments supported by each section, a land-wheel and two furrow-wheels connected to one section, and a single land-wheel and a single furrow-wheel connected to each other section.

6. In a wheeled plow, the combination of a plurality of connected sections, a plowing attachment supported by each section, a land-wheel and two furrow-wheels connected to one section, and a single land-wheel and a single furrow-wheel connected to each other section.

7. In a wheeled plow, the combination of a plurality of connected sections, a plowing attachment supported by each section, a land-wheel and two furrow-wheels connected to one section, and a single land-wheel and a single furrow-wheel connected to another section.

8. In a wheeled plow, the combination of a plurality of connected sections, wheels supporting the sections, and a plowing attachment supported by each section, one of the wheels being a furrow-wheel and located in rear of a plowing attachment of one section to follow in the furrow made thereby, and located in advance of the plowing attachment of the other section.

9. In a wheeled plow, the combination of a plurality of connected sections, wheels supporting the sections, and a plowing attachment supported by each section, one of the wheels being a furrow-wheel and located between the plowing attachment of one section and the plowing attachment of another section.

10. In a wheeled plow, the combination of a plurality of connected sections, the rear portion of one being associated with the front of the one next adjacent, a plurality of plowing attachments supported by each section, and wheels supporting the sections, one of the wheels being a furrow-wheel and located adjacent to the rear end of one section and the forward end of the next rear section.

11. In a wheeled plow, the combination of a plurality of connected sections, the rear portion of one being associated with the front portion of the one next adjacent, a plowing attachment supported by each section, and wheels supporting the sections, one of the wheels being a furrow-wheel and located adjacent to the rear end of one section and adjacent to the forward end of the next rear section.

12. In a wheeled plow, the combination of a plurality of connected sections, the rear portion of one being associated with the front portion of the one next adjacent, a plowing attachment supported by each section, and wheels supporting the sections, one of the wheels being a furrow-wheel and located adjacent to the rear end of one section and adjacent to the forward end of the next rear section and assisting to support both sections.

13. In a wheeled plow, the combination of a plurality of connected sections, a plowing attachment supported by each section, a land-wheel connected to each section, and a single furrow-wheel assisting to support both sections and located rearward of one land-wheel and forward of the other land-wheel.

14. In a wheeled plow, the combination of a plurality of connected sections, a plowing attachment supported by each section, a land-wheel and a furrow-wheel connected to each section, and another furrow-wheel assisting to support both sections.

15. In a wheeled plow, the combination of a plurality of connected sections, wheels supporting the sections, and a plowing attachment supported by each section, one of the wheels being a furrow-wheel and located between the last plowing attachment of one section and the first plowing attachment of another section and assisting to support both sections.

16. In a wheeled plow, the combination of a plurality of connected sections, wheels supporting the sections, a plurality of plowing attachments connected to each section, and a furrow-wheel located adjacent to the rear plowing attachment of one section, and the forward plowing attachment of another section, and assisting to support both sections.

17. A wheeled plow including a plurality of sections, and pivotal connections between the same to flex relatively in either a vertical or a horizontal direction.

18. In a wheeled plow, the combination of a plurality of pivotally-connected sections, wheels supporting the sections, and a plowing attachment supported by each section, the connection between the sections permitting the sections to flex relatively in both a horizontal and oblique direction.

19. In a wheeled plow, the combination of a plurality of connected sections, wheels supporting the sections, a plowing attachment supported by each section, and means for adjusting one section vertically independent of the other section and located adjacent to the point of connection between the sections.

20. In a wheeled plow, the combination of a plurality of connected sections, wheels supporting the sections, a plowing attachment supported by each section, and means located adjacent to the connection between the sections for adjusting the sections vertically with respect to one another.

21. In a wheeled plow, the combination of a plurality of sections, a plowing attachment supported by each section, a land-wheel, a front furrow-wheel and a rear furrow-wheel connected to one section, the rear furrow-wheel having an arm connection therewith, another section having a connection with the arm, a land-wheel and a rear furrow-wheel connected to the said other section.

22. In a wheeled plow, the combination of a plurality of sections, a plowing attachment supported by each section, a land-wheel and a furrow-wheel connected to each section, a connection between adjacent sections comprising a furrow-wheel having an arm connection with one section and a connection with another section.

23. In a wheeled plow, the combination of a plurality of sections, a plowing attachment supported by each section, a land-wheel and a furrow-wheel connected to each section, an arm having a connection with one section, another furrow-wheel connected to the arm, a shaft rising from the arm, and a connection between the next section and the shaft.

24. In a wheeled plow, the combination of a plurality of sections, a plowing attachment supported by each section, a land-wheel and a furrow-wheel connected to each section, an arm having a pivotal connection with one section in a manner to move in a horizontal plane, a furrow-wheel supported by the arm, and a connection between the arm and the next section.

25. In a wheeled plow, the combination of a plurality of sections, a plowing attachment supported by each section, a land-wheel and a furrow-wheel connected to each section, an arm connected to one section, an arm connected to an adjacent section, and a connection between the arms and a furrow-wheel located adjacent to the connection between the arms and assisting to support both arms.

26. In a wheeled plow, the combination of a plurality of sections, a plowing attachment supported by each section, a land-wheel and a furrow-wheel connected to each section, an arm connected to one section, an arm connected to an adjacent section, a flexible connection between the arms, and a furrow-wheel located adjacent to the connection between the arms and assisting to support both arms.

27. In a wheeled plow, the combination of a plurality of sections, a plowing attachment supported by each section, a land-wheel and a furrow-wheel connected to each section, an arm connected to one section, a connection between the arm and an adjacent section, and a single furrow-wheel located adjacent to such connection and assisting to support both sections.

28. In a wheeled plow, the combination of a plurality of sections, a plowing attachment supported by each section, a land-wheel and a furrow-wheel connected to each section, another furrow-wheel having an arm connection with one section and a connection with an adjacent section, and a draft connection with each section.

29. In a wheeled plow, the combination of a plurality of connected sections, wheels supporting the sections, a plowing attachment supported by each section, one of the wheels located adjacent to the connection between the sections, and assisting to support both sections, and a hand-lever arrangement in connection with the last-mentioned wheel for adjusting the height of one section relative to the adjacent section and adjacent to the point of connection.

30. In a wheeled plow, the combination of a plurality of connected sections, wheels supporting the sections, a plowing attachment supported by each section, connections between the sections, and hand-lever arrangement between the sections for adjusting the sections vertically with respect to one another.

31. In a wheeled plow, the combination of a plurality of connected sections, wheels supporting the sections, a plowing attachment supported by each section, connections between the sections, the connections between the sections permitting of a vertical oscillation, and hand-lever arrangement between the sections for adjusting the sections vertically with respect to one another.

32. In a wheeled plow, the combination of a plurality of connected sections, a plowing atachment supported by each section, wheels supporting the sections, one of the wheels being a furrow-wheel and assisting to support both sections, a lever arrangement in connection with the furrow-wheel for regulating the height of one section, and a lever arrangement for regulating the height of the other section and adjacent to the point of connection between the sections.

33. In a wheeled plow, two connected sections, wheels supporting the sections, the connection between the sections permitting the same to flex relatively in both a vertical and a horizontal direction, a plowing attachment supported by each section, and a draft device for the sections, said draft device being independent of the connection between the sections.

34. In a wheeled plow, the combination with a draft appliance, of a plurality of sections, the front portion of one being associated with the rear portion of the next adjacent, a connection between the adjacent portions of the sections, a draft connection between the front end of each section and the draft appliance, and a plowing attachment supported by each section.

35. In a wheeled plow, the combination of a draft appliance, of a plurality of sections, the front portion of one being associated with the rear portion of the next adjacent, a plurality of independent connections between said adjacent portions of the various sections, and a draft connection between the front end of each section and the draft appliance.

36. In a wheeled plow, the combination with a draft appliance, of a plurality of sections, the front portion of one being associated with the rear portion of the next adjacent, a connection between the adjacent portions of any two sections, a draft connection between the front end of each section and the draft appliance and independent of the connection between the sections, wheels supporting the sections, and a plowing attachment connected to each section.

37. In a wheeled plow, the combination of a plurality of connected sections, wheels supporting the sections, a plowing attachment supported by each section, a draft-bar, and a connection between each section and the draft-bar, one of the wheels being a furrow-wheel and assisting to support both sections.

38. In a wheeled plow, the combination of a plurality of end-connected sections, a plowing attachment supported by each section, wheels supporting the sections, one of the wheels being a furrow-wheel and located adjacent to the connection between the sections, and a draft connection with each section.

39. In a wheeled plow, the combination with a draft appliance, of a plurality of sections, the front end of one being connected to the rear end of the next adjacent, the foremost section having a connection with the draft appliance, and a plurality of links connected to the front ends of the other sections and to the draft appliance.

40. In a wheeled plow, the combination with a draft appliance, of a plurality of sections, the front end of one being connected to the rear end of the next adjacent, the foremost section having a connection with the draft appliance, a plurality of links connected to the front ends of the other sections and to the draft appliance, a wheel connected to each section, and a plowing attachment supported by each section, the connection between the sections being independent of the draft connections.

WALTER P. HENDON.

Witnesses:
  A. O. BEHEL,
  L. VEATCH.